United States Patent [15] 3,644,277
Gilles [45] Feb. 22, 1972

[54] PHENOLIC ISOCYANURATES USED AS STABILIZERS

[72] Inventor: Jack C. Gilles, Shaker Heights, Ohio
[73] Assignee: The B. F. Goodrich Company, New York, N.Y.
[22] Filed: Sept. 28, 1970
[21] Appl. No.: 76,259

Related U.S. Application Data

[62] Division of Ser. No. 770,846, Oct. 25, 1968.

[52] U.S. Cl..........................260/45.8 N, 44/63, 252/51.5 R, 260/45.85, 260/45.95, 260/398.5
[51] Int. Cl. ......................................................C08f 45/60
[58] Field of Search....................260/45.8 N, 248 NS, 398.5; 44/63; 252/51.5 R

[56] References Cited

UNITED STATES PATENTS 3,531,483   9/1970   Gilles.....................................260/248

Primary Examiner—Donald E. Czaja
Assistant Examiner—R. A. White
Attorney—J. Hughes Powell, Jr. and Ernest K. Bean

[57] ABSTRACT

Novel mixed esters of isocyanuric acid have been prepared. These bis-(hydroxyphenylalkylene)alkyl isocyanurate compounds provide excellent stabilization for organic materials against oxidative, thermal and photochemical degradation. The stability of $\alpha$-monoolefin homopolymers and copolymers is particularly enhanced by the use of stabilizing amounts of the bis-(hydroxybenzyl)isocyanurates.

13 Claims, No Drawings

PHENOLIC ISOCYANURATES USED AS STABILIZERS

This is a division of application Ser. No. 770,846 filed Oct. 25, 1968.

BACKGROUND OF THE INVENTION

Triesters of cyanuric acid wherein the ester substituent is an aliphatic or aromatic hydrocarbon radical containing up to eight carbon atoms are known. Monoalkyl- or monoaryl-substituted isocyanurates are also known. Mixed esters of isocyanuric acid, that is, where both alkyl and aryl groups are substituted, have not been reported. Neither is it known to have isocyanurates wherein the aryl substituent is functionally substituted with a hydroxyl group.

SUMMARY OF THE INVENTION

I have now prepared mixed esters of isocyanuric acid wherein an alkyl group and hydroxyaryl groups are substituted on the isocyanuric acid ring. More particularly, this invention relates to novel phenolic esters of isocyanuric acid, even more specifically to bis-(hydroxyphenylalkylene)alkyl isocyanurates. The hydroxyphenylalkyleneyl radicals are alkyl-substituted, that is, they contain one or more alkyl radicals on the aromatic nucleus and, in particular, have the position immediately adjacent to the hydroxyl group substituted with an alkyl group. Preferred compounds of the present invention will have the hydroxyl group hindered with a tertiary alkyl group.

The mixed esters of the present invention are useful stabilizers for a wide variety of organic materials. They possess low volatility, show excellent compatibility with most organic materials, are nonstaining and are extremely effective protective agents. They serve to stabilize organic polymeric materials, both natural and synthetic, against the deleterious effects of oxygen, heat and visible or ultraviolet light. They are especially useful as stabilizers for $\alpha$-monoolefin homopolymers and copolymers particularly polyethylene, polypropylene, ethylene-propylene copolymer and ethylene-propylene terpolymers.

DETAILED DESCRIPTION

The compounds of the present invention are represented by the general formula

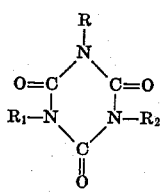

wherein R is a branched or straight chain aliphatic hydrocarbon radical containing from one to 18 carbon atoms and $R_1$ and $R_2$ are hydroxyphenylalkylene radicals having the formula

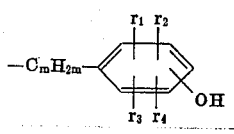

wherein $m$ is an integer from 1 to 4, $r_1$ is an alkyl group, aliphatic or cycloaliphatic, containing from one to 18 carbon atoms and positioned immediately adjacent to the hydroxyl group on the ring, and $r_2$, $r_3$ and $r_4$ are hydrogen or aliphatic or cycloaliphatic groups containing from one to 18 carbon atoms. Especially useful isocyanuric acid mixed esters are those compounds wherein R is an alkyl group containing from six to 20 carbon atoms, $r_1$ is a tertiary alkyl group containing from four to 12 carbon atoms, $r_2$ is an alkyl group containing from one to 12 carbon atoms, $r_3$ and $r_4$ are hydrogen and $m$ is 1. Accordingly preferred hydroxybenzyl radicals include the 3,5-di-t-butyl-4-hydroxybenzyl radical, the 3-methyl-5-t-butyl-4-hydroxybenzyl radical, the 2-methyl-5-t-butyl-4-hydroxybenzyl radical, the 3-t-butyl-5-methyl-2-hydroxybenzyl radical or like radicals.

The present invention encompasses the bis-(3,5-di-t-alkyl-4-hydroxybenzyl)alkyl isocyanurates represented by the formula

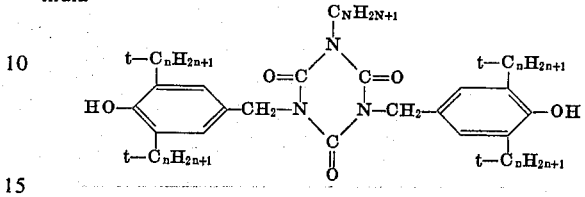

wherein $N$ is an integer from 6 to 18 and n is an integer from four to eight. These compounds are excellent stabilizers for organic materials which are subject to oxidative, thermal and photochemical degradation such as, for example, natural rubber and olefin homopolymers and copolymers. They possess an excellent balance of properties making them useful for most stabilizing applications. It is especially significant with these compounds that they are high molecular weight with a high weight ratio of phenol and contain an alkyl group attached to the isocyanurate ring, which attributes to their excellent solubility in most organic materials.

Typical of the mixed isocyanurates within the scope of the present invention are: bis-(3-methyl-4-hydroxybenzyl) hexyl isocyanurate, bis-(3-t-butyl-4-hydroxybenzyl)hexyl isocyanurate, bis-(3,5-di-methyl-4-hydroxybenzyl)hexyl isocyanurate, bis-(3,5-di-t-butyl-4-hydroxybenzyl)hexyl isocyanurate, bis-(3-t-amyl-4-hydroxybenzyl)dodecyl isocyanurate, bis-(3,5-di-t-butyl-4-hydroxybenzyl)dodecyl isocyanurate, bis-[3,5-di-(-1-methyl-1-ethylpropyl)-4-hydroxybenzyl]dodecyl isocyanurate, bis-[3,5-di(1,1,2,2-tetramethylpropyl)-4-hydroxybenzyl]dodecyl isocyanurate, bis(3,5-di-t-butyl-4-hydroxybenzyl)hexadecyl isocyanurate, bis(3,5-di-t-amyl-4-hydroxybenzyl)hexadecyl isocyanurate, bis-(3,5-di-t-butyl-4-hydroxybenzyl)octadecyl isocyanurate and the like. It is not necessary that the hydroxyaryl substituents be the same, however, it is generally easier to obtain pure compounds when the phenolic moieties are the same. Also within the scope of the present invention are isocyanuric acid esters wherein only one substituent is a hydroxyaryl group. In this case, the remaining two positions on the isocyanuric acid ring may be substituted with two alkyl groups, one alkyl group and a hydrogen or other suitable radical.

The bis-(hydroxybenzyl)alkyl isocyanurates are high melting crystalline solids soluble in acetone, diethyl ether, dioxane, tetrahydrofuran, carbon tetrachloride, chloroform, aromatic hydrocarbons such as benzene and toluene and slightly soluble in the aliphatic hydrocarbons and alcohols such as methanol and ethanol. The present compounds are insoluble in water. These materials typically range in color from white to a very pale yellow when pure. However, if appreciable amounts of solvent or other contaminants are present, color will develop upon exposure to air.

The bis-(hydroxybenzyl)alkyl isocyanurates are obtained by reacting the monoalkyl-substituted isocyanurate with the appropriate phenolic substituent in accordance with any one of a number of procedures. For example, the monoalkyl isocyanurate can be reacted with an alkali metal cyanate and a hydroxybenzyl halide in an aprotic solvent, such as dimethyl sulfoxide or N,N-dimethylformamide, at an elevated temperature. A process such as that described in U.S. Pat. No. 3,075,979 may also be employed to prepare the bis-(hydroxybenzyl)alkyl isocyanurates. Still another means to obtain the bis(hydroxybenzyl)alkyl isocyanurates is the condensation reaction of the monoalkyl isocyanurate with formaldehyde and a hindered phenol.

The monoalkyl-substituted isocyanurate may be obtained through a series of known reactions wherein biuret is nitrated according to the procedure described in *J. Amer. Chem. Soc.*, 51, 1801 (1929) by Davis and Blanchard. The nitrobiuret is then substituted with the desired alkyl substituent by reacting it with an equimolar quantity of the corresponding monoalkylamine as reported by Dunnigan et al., (*J. Amer. Chem. Soc.*, 75, 3,615–16 (1953)). The monoalkylbiuret is then condensed with ethyl carbonate according to the procedure of W. J. Close (*J. Amer. Chem. Soc.*, 75, 3617–18 (1953)) to obtain the monoalkyl-substituted isocyanurate.

A great variety of compounds are within the scope of the present invention due to the versatility of the above-mentioned reaction steps. The nitrobiuret, for example, may be reacted with any of a wide variety of reactive amines and need not necessarily be limited to monoalkylamines. Benzyl amine and substituted benzylamines could be employed. Similarly, diamines such as ethylene diamine, propylene diamine, triethylene diamine or the like could be employed to form molecules having two biuret moieties joined by an alkylene linkage. This molecule could then be condensed with two mols of ethyl carbonate to form a bis-(isocyanurate) compound capable of being substituted with phenolic substituents. Other similar structural modifications of the present compounds could also be envisioned by those skilled in the art.

The present bis-(hydroxyphenylalkylene)alkyl isocyanurates find utility in that they are extremely effective protective agents for a wide variety of organic materials against the deleterious effects of oxygen, heat and light. Their efficiency as a stabilizer results at least partially from their ready compatibility with most organic materials and the ability of the isocyanurate ring to be substituted with two hindered phenol groups, thus providing a high molecular weight compound while maintaining a high weight ratio of hindered phenol to the overall weight of the compound.

Organic materials which are stabilized in accordance with the present invention include both natural and synthetic polymer. The bis-(hydroxyphenylalkylene)alkyl isocyanurates are useful for the stabilization of natural rubber; halogenated rubber; homopolymers of ethylene, propylene, butene-1, isobutylene, pentene-1, hexene-1, 4-methyl-1-pentene and the like or copolymers thereof such as ethylene-propylene copolymer, ethylene-butene-1 copolymer, 4-methyl-1-pentene-octene-1 copolymer and the like; ethylene-propylenediene rubbers wherein the diene is 1,4-hexadiene, 2-methyl-1,4-hexadiene, a dimethyl-1,4,9-decatriene, dicyclopentadiene, vinyl cyclohexene, vinyl norbornene, ethylidene norbornene, methylene norbornene, norbornadiene, methyl norbornadiene, methyl tetrahydroindene and the like; conjugated diene polymers as for instance polybutadiene, copolymers of butadiene with styrene, acrylonitrile, acrylic acid, alkyl acrylates or methacrylates, methyl vinyl ketone, vinyl pyridine, etc., polyisoprene, polychloroprene and the like; vinyl polymers such as polyvinyl chloride, polyvinyl fluoride, polyvinylidene chloride, copolymers of vinyl chloride with vinylidene chloride, polyvinyl acetate, copolymers of vinyl halide with butadiene, styrene, vinyl esters, $\alpha,\beta$-unsaturated acids and esters thereof, $\alpha,\beta$-unsaturated ketones and aldehydes, and the like; homopolymers and copolymers of acrylic monomers such as acrylic acid, methacrylic acid, methyl acrylate, methyl methacrylate, ethyl acrylate, 2-ethylhexyl acrylate, acrylamide, methacrylamide, N-methylolacrylamide, acrylonitrile, methacrylonitrile and the like; polyether- or polyol-derived polyurethanes; acetal homopolymers and copolymers; polycarbonates; polyesters such as those derived from maleic, fumaric, itaconic or terephthalic anhydrides or the like, for example, polymethylene terephthalate; polyamides such as those derived fro the reaction of hexamethylenediamine with adipic or sebacic acid; epoxy resins such as those obtained from the condensation of epichlorohydrin with bisphenols; and the like.

In addition to polymeric materials, the present compounds act to stabilize a wide variety of other organic materials. Such compounds include: waxes; synthetic and petroleum derived lubricating oils and greases; animal oils such as, for example, fat, tallow, lard, cod liver oil, sperm oil; vegetable oils such as castor, linseed, peanut, palm, cotton seed and the like; fuel oil; diesel oil; gasoline; and the like.

The bis-(hydroxybenzyl)alkyl isocyanurates are especially useful for the stabilization of $\alpha$-monoolefin homopolymers and copolymers. High- and low-density polyethylene, polypropylene, polyisobutylene and poly-(4-methyl-1-pentene) have excellent resistance to oxidative attack when stabilized with the compounds of the present invention. Ethylene-propylene copolymer and ethylene-propylene terpolymers containing one or more termonomers containing multiple unsaturation also possess excellent stability when stabilized with the present mixed esters of isocyanuric acid. Polymer blends, that is, physical admixtures of two or more polymers may also be stabilized in accordance with the present invention.

Certain bis-(hydroxybenzyl)alkyl isocyanurates are more useful for certain applications than others due to the compatibility of the particular isocyanurate with the organic material to be stabilized. This is the result of a variety of factors such as the type of alkyl substitution on the phenol ring, the particular alkyl group substituted on the isocyanurate ring and the like. The amount of stabilizer employed will vary with the particular material to be stabilized and also the isocyanurate compound employed. Generally, however, for effective stabilization of organic materials an amount of the bis-(hydroxybenzyl)alkyl isocyanurate ranging from about 0.001 percent to about 10 percent by weight based on the weight of the organic material will be employed. In most applications the amount of bis-(hydroxybenzyl)alkyl isocyanurate used will vary between about 0.01 percent and about 5 percent by weight. With the $\alpha$-monoolefin homopolymers and copolymers, about 0.01 percent to about 1.5 percent by weight of the stabilizer based on the weight of the olefin polymer will be employed.

The compounds of the present invention can be readily incorporated into the organic materials to be stabilized and generally require no special processing. Conventional methods of incorporation have been found adequate. For example, the bis-(hydroxybenzyl)alkyl isocyanurates are incorporated into polymers by mixing on a rubber mill or in a Banbury mixer; or they may be added, alone, in a suitable solvent, or masterbatched with other ingredients, to a solution or dispersion of the polymer. The ready solubility of the compounds of this invention in a wide variety of organic solvents facilitates their use as solutions and also renders them compatible with most oils and lubricants.

The bis-(hydroxybenzyl)alkyl isocyanurates are compatible with conventional compounding ingredients such as, for example, processing oils, plasticizers, lubricants, antisticking agents, fillers, reinforcing agents, sulfur and other curing agents, accelerators, antifoaming agents, rust inhibitors, pourpoint depressants and the like.

They are compatible with other known antioxidants, antiozonants, color stabilizers, heat stabilizers, ultraviolet absorbers and the like. Often when employed in combination with known stabilizers, a synergistic effect will be produced. Synergism will generally result in $\alpha$-monoolefin homopolymers and copolymers when the bis-(hydroxybenzyl)alkyl isocyanurates are combined with peroxide decomposing compounds such as dithiocarbamates, zinc dialkylthiophosphates or organic sulfides such as those described in U.S. Pat. No. 2,519,755. Especially effective to produce synergistic activity with the compounds of the present invention are diesters of $\beta$-thiodipropionic acid having the formula ROOCCH$_2$CH$_2$S-CH$_2$CH$_2$COOR wherein R is an alkyl group containing from six to 20 carbon atoms such as octyl, nonyl, decyl, lauryl, cetyl, stearyl, palmityl, benzyl, cyclohexyl and the like. When employing a bis-(hydroxybenzyl) alkyl isocyanurate/$\beta$-dialkylthiodipropionate stabilizer systems, the $\beta$-dialkylthiodipropionate is employed on an equal weight parts basis up to about 5 parts per part of the bis-(hydroxybenzyl)alkyl isocyanurate. Other useful stabilizer compositions possessing synergistic activity are obtained when the bis-(hydroxybenzyl)alkyl isocyanurates are combined with other phenolic compounds, which are well known to the art, such as 2,6-di-t-butyl-4-methyl phenol, tetra[methylene-3-(3,5-di-t-butyl-4-hydroxyphenyl)propionate]methane, 1,3,5-trimethyl-2,4,6-tris(3,5-di-t-butyl-4-hydroxybenzyl)benzene, octadecyl-3-(3,5-di-t-butyl-4-hydroxyphenyl)propionate, tris-(3,5-di-t-butyl-4-hydroxyphenyl)phosphate, 4,4'-thiobis-(3-methyl-6-t-butylphenol) and the like.

The following examples serve to illustrate the invention more fully. All parts and percentages unless otherwise indicated are on a weight basis.

EXAMPLE I

Bis-(3,5-di-t-butyl-4-hydroxybenzyl)hexyl isocyanurate was prepared as follows: 100 g. (0.97 mol) biuret, 66 ml. nitric acid and 250 ml. concentrated sulfuric acid. The cooled mixture of nitric acid and sulfuric acid were charged to the reactor containing the biuret over a 2 hour period while maintaining the temperature between about 25° and 30° C. The reaction mixture was then poured into ice and the solid produce obtained therefrom, washed several times with water and ethanol. 83.9 g. of the nitrobiuret melting at 144.5° C. was obtained.

Nitrobiuret (37 g.; 0.25 mol) was reacted for 35 minutes at about 90° C. with 25.25 g. (0.25 mol) hexylamine in 250 ml. water. The hexylbiuret (M.P. 126°-127.5° C.) was obtained by recrystallization from aqueous ethanol.

Hexyl biuret was then condensed with ethyl carbonate to obtain hexyl isocyanurate. Sodium ethoxide was formed by reacting 2.3 g. sodium metal (0.1 mol) with 100 ml. of ethanol. The hexylbiuret (9.39 g.; 0.05 mol) and diethyl carbonate (12.0 g.; 0.1 mol) were then added to the sodium ethoxide and the reaction mixture heated to reflux for about 18 hours. The solid formed was removed by filtration and the hexyl isocyanurate obtained by the addition of 50 percent HCl to this filtrate. The hexyl isocyanurate, recrystallized from aqueous ethanol, had a melting point of 223°-226° C.

Hexyl isocyanurate (10.6 g.; 0.05 mol) was charged to a reactor containing about 100 ml. N,N-dimethylformamide and 6.9 g. potassium carbonate. This mixture was heated to about 115° C. and 25.5 g. (0.1 mol) 2,6-di-t-butyl-benzyl chloride dissolved in about 50 ml. N,N-dimethylformamide added dropwise over a 2 hour period followed by an additional 6 hours heating at this temperature. The reaction mixture was allowed to cool and the bis-(3,5-di-t-butyl-4-hydroxybenzyl)hexyl isocyanurate precipitated by the addition of aqueous ethanol. The product was further recrystallized from acetone and water and had a melting point of 113°-114.5° C. Infrared analysis and nuclear magnetic resonance spectroscopy confirmed the product to be the bis-(3,5-di-t-butyl-4-hydroxy-benzyl)hexyl isocyanurate.

EXAMPLE II

The bis-(3,5-di-t-butyl-4-hydroxybenzyl)hexyl isocyanurate obtained from Example I was employed, by itself and in combination with β-dilauryl thiodipropionate, to stabilize a conventional high density polyethylene. The stabilizing additives were incorporated in the polyethylene by dissolving them in an acetone suspension of the polyethylene and then removing the acetone under vacuum with a rotary evaporator. The stabilized polyethylene was then hot milled (290°-300° F.) for 5 minutes, sheeted off, and placed in a warm four-cavity ACS mold, shimmed to 10 mil thickness. The mold was closed and heated at 300° F. for 10 minutes with the application of 150 tons pressure for the last 5 minutes. The samples were then allowed to cool to room temperature under pressure. Oxygen absorption data was obtained for these samples by aging the samples at 140° C. in pure oxygen in a modified Scott tester block. The induction periods, that is, the time required for autooxidation of the polyethylene to occur, was about 52 hours for the polyethylene samples stabilized with 0.1 part bis-(3,5-di-t-butyl-4-hydroxybenzyl)hexyl isocyanurate and about 115 hours for the sample stabilized with 0.1 part bis-(3,5-di-t-butyl-4-hydroxybenzyl)isocyanurate in combination with 0.2 part β-dilauryl thiodipropionate. A polyethylene sample which contained no stabilizer had an induction time of less than 1 hour.

Similar stabilization of polypropylene, and a copolymer of 4-methyl-pentene-1 and hexene-1 was achieved by the use of 0.1 part bis-(3,5-di-t-butyl-4-hydroxybenzyl)hexyl isocyanurate. Ethylene-propylene-1,4-hexadiene terpolymer containing 1.0 part bis-(3,5-di-t-butyl-4-hydroxybenzyl)hexyl isocyanurate also had markedly enhanced stability over the unstabilized polymer.

EXAMPLE III

Bis-(3,5-di-t-butyl-4-hydroxybenzyl)dodecyl isocyanurate was prepared employing a procedure similar to that described in Example I. Nitrobiuret was reacted with dodecylamine to obtain the dodecylbiuret (M.P. 131°-132.5° C.). The dodecylbiuret was then reacted with ethyl carbonate in sodium ethoxide to obtain the dodecyl isocyanurate. The dodecyl isocyanurate had a melting point of 155°-158° C. The structure was confirmed by infrared analysis and nuclear magnetic resonance spectroscopy.

Bis-(3,5-di-t-butyl-4-hydroxybenzyl)dodecyl isocyanurate was the prepared by the dropwise addition of a mixture of 14.8 g. (0.05 mol) dodecyl isocyanurate, 3.0 g. (0.1 mol) formaldehyde and a catalytic amount of hexamethylene-tetramine to a reactor containing 20.6 g. 2,6-di-t-butyl-phenol dissolved in 100 ml. N,N-dimethylformamide and 10 ml. water. The reaction was heated to reflux for 4 hours. The solid obtained was recrystallized from hexane and had a melting point of 84°-86° C. Infrared analysis and nuclear magnetic resonance spectroscopy confirmed the structure as bis-(3,5-di-t-butyl-4-hydroxybenzyl)dodecyl isocyanurate. Polyethylene stabilized with 0.1 part of the bis-(3,5-di-t-butyl-4-hydroxybenzyl)dodecyl isocyanurate had an induction period of 48 hours when aged in pure oxygen at 140° C. The induction period was increased to about 120 hours by combining 0.2 part β-distearyl thiodipropionate with the bis-(3,5-di-t-butyl-4-hydroxybenzyl) dodecyl isocyanurate. Polyethylene samples aged in a forced air oven at 125° C. showed similar improvements over unstabilized polyethylene samples. Other organic materials, for example, mineral oil and lubricating compositions, were similarly stabilized with the bis-(hydroxybenzyl)alkyl isocyanurates of this invention.

Bis-(3-methyl-5-t-butyl-4-hydroxybenzyl)hexadecyl isocyanurate and bis-(3-t-butyl-5-methyl-2-hydroxybenzyl)dodecyl isocyanurate also proved to be excellent stabilizers for polyethylene and polypropylene. In addition to improving the stability of samples aged in an oxygen atmosphere, the polypropylene samples, when exposed in a Xenon dry-cycle weatherometer, showed far less color formation and embrittlement than unstabilized polypropylene control samples.

The above Examples clearly demonstrate the ability of the bis-(hydroxybenzyl)alkyl isocyanurates to stabilize organic materials, especially α-monoolefin homopolymers and copolymers.

I claim:

1. A stabilized composition of matter which comprises an organic material subject to the deleterious effects of oxygen, heat and light and from about 0.001 percent to about 10 percent by weight of a bis-(hydroxyphenylalkylene)alkyl isocyanurate of the formula

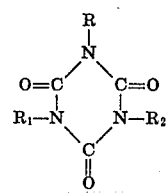

wherein R is an alkyl radical containing from one to 20 carbon atoms and $R_1$ and $R_2$ are hydroxyphenylalkylene radicals having the formula

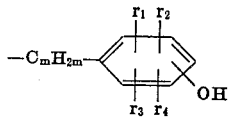

wherein $m$ is an integer from 1 to 4, $r_1$ is an alkyl group containing from one to 18 carbon atoms and positioned immediately adjacent to the hydroxyl group on the ring, and $r_2$, $r_3$ and $r_4$ are hydrogen or alkyl groups containing from one to 18 carbon atoms.

2. The stabilized composition of matter of claim 1 wherein $r_1$ is a tertiary alkyl group containing from four to 12 carbon atoms, $r_2$ is an alkyl group containing from one to 12 carbon atoms, $r_3$ and $r_4$ are hydrogen and $m$ is 1.

3. The stabilized composition of matter of claim 2 wherein the organic material is an α-monoolefin homopolymer or copolymer.

4. The stabilized composition of matter of claim 2 wherein $r_1$ and $r_2$ are tertiary alkyl groups containing from four to 8 carbon atoms and R is an alkyl group containing from six to 18 carbon atoms.

5. The stabilized composition of matter of claim 4 wherein the organic material is an α-monoolefin homopolymer or copolymer.

6. The stabilized composition of matter of claim 5 wherein the polymer is polyethylene.

7. The stabilized composition of matter of claim 5 wherein the polymer is polypropylene.

8. The stabilized composition of matter of claim 5 wherein the polymer is an ethylene-propylene polymer.

9. The stabilized composition of matter which comprises (a) an α-monoolefin homopolymer or copolymer, (b) about 0.01 to about 5 percent by weight of a bis-(hydroxyphenylalkylene) alkyl isocyanurate of the formula

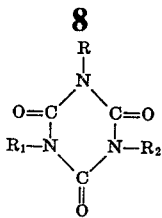

wherein R is an alkyl radical containing from one to 20 carbon atoms and $R_1$ and $R_2$ are hydroxyphenylalkylene radicals having the formula

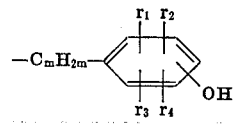

wherein $m$ is an integer from 1 to 4, $r_1$ is an alkyl group containing from one to 18 carbon atoms and positioned immediately adjacent to the hydroxyl group on the ring, and $r_2$, $r_3$ and $r_4$ are hydrogen or alkyl groups containing from one to 18 carbon atoms; and (c) from about 1 part to 5 parts per part of said isocyanurate of a β-dialkylthiodipropionate compound having the formula $ROOCCH_2CH_2\text{-}S\text{-}CH_2CH_2COOR$ wherein R is an alkyl group containing from six to 20 carbon atoms.

10. The stabilized composition of matter of claim 9 wherein $r_1$ of the hydroxyphenylalkylene radical is a tertiary alkyl group containing from four to 12 carbon atoms, $r_2$ is an alkyl group containing from one to 12 carbon atoms, $r_3$ and $r_4$ are hydrogen and $m$ is 1.

11. The stabilized composition of matter of claim 10 wherein the α-monoolefin polymer is selected from the group consisting of polyethylene and polypropylene.

12. The stabilized composition of matter of claim 11 wherein $r_1$ and $r_2$ are tertiary alkyl groups containing from four to 8 carbon atoms, R is an alkyl group containing from six to 18 carbon atoms and the β-dialkylthiodipropionate is selected from the group consisting of β-dilaurylthiodipropionate or β-distearylthiodipropionate.

13. The stabilized composition of matter of claim 5 wherein the polymer is an ethylene-propylene-diene polymer.

* * * * *